United States Patent [19]

Tomomatsu et al.

[11] Patent Number: 5,113,725

[45] Date of Patent: May 19, 1992

[54] HYDRAULIC CONTROL DEVICE OF AUTOMATIC TRANSMISSION MORE SMOOTH IN LOW COAST UPSHIFTING UNDER UNDER-D MANUAL SHIFT RANGE

[75] Inventors: Hideo Tomomatsu; Yasuo Hojo, both of Nagoya, Japan

[73] Assignee: Toyota Jidosha Kabushiki Kaisha, Toyota, Japan

[21] Appl. No.: 584,784

[22] Filed: Sep. 19, 1990

[30] Foreign Application Priority Data

Sep. 22, 1989 [JP] Japan .................. 1-247279
Sep. 22, 1989 [JP] Japan .................. 1-247281

[51] Int. Cl.⁵ .............................................. B60K 41/06
[52] U.S. Cl. ...................................... 74/869; 74/866; 364/424.1
[58] Field of Search ............... 74/866, 869; 364/424.1

[56] References Cited

U.S. PATENT DOCUMENTS

| | | | |
|---|---|---|---|
| 3,823,621 | 7/1974 | Kubo et al. | 74/869 X |
| 4,512,212 | 4/1985 | Ishikawa | 74/869 X |
| 4,724,725 | 2/1988 | Harada et al. | 74/866 |
| 4,745,826 | 5/1988 | Nishikawa et al. | 74/866 |
| 4,776,240 | 10/1988 | Miki | 74/869 |
| 4,856,383 | 8/1989 | Rosen | 74/869 |
| 4,858,500 | 8/1989 | Harada et al. | 74/866 |
| 4,953,091 | 8/1990 | Baltusis et al. | 74/869 X |
| 5,010,788 | 4/1991 | Sugano et al. | 74/869 X |

Primary Examiner—Leslie A. Braun
Assistant Examiner—David E. Henn
Attorney, Agent, or Firm—Oblon, Spivak, McClelland, Maier & Neustadt

[57] ABSTRACT

A hydraulic control device is provided for automatic transmission in a vehicle such as an automobile. The transmission includes a combination of a gear mechanism and friction engaging devices which allows engagement of a particular first speed stage, such as first gear, and a particular second speed stage, such as second gear, according to selective engagement and disengagement of the friction engaging devices. Engine braking is not provided in the first speed stage, but is provided in the second speed stage when an under-D range is selected by the manual shift valve. Low coast upshifting is thus performed more smoothly. The shift from the first speed stage to the second speed stage is also completed more slowly than any other shift.

13 Claims, 5 Drawing Sheets

HYDRAULIC CONTROL DEVICE OF AUTOMATIC TRANSMISSION MORE SMOOTH IN LOW COAST UPSHIFTING UNDER UNDER-D MANUAL SHIFT RANGE

BACKGROUND OF THE INVENTION

1. Field of the Invention

The present invention relates to a hydraulic control device of an automatic transmission in a vehicle, and more particularly, to a control of a friction engaging means such as a brake or a clutch in the automatic transmission for selectively obtaining engine braking in the coasting of the vehicle.

2. Description of the Prior Art

It is well known in the art of the automatic transmission in a vehicle to incorporate a hydraulically operated friction engaging means such as a brake or a clutch in parallel with a one way brake or a one way clutch so as selectively to brake a rotary component of a planetary gear mechanism relative to a casing thereof or selectively to connect a first rotary component of a planetary gear mechanism with a second rotary component thereof or a rotary component of a first planetary gear mechanism with a rotary component of a second planetary gear mechanism in order to set up a speed stage in the transmission, so that, when the hydraulically operated friction engaging means is left as disengaged, the one way clutch is automatically engaged or disengaged at an appropriate timing when the rotational speed of one rotary component would get higher or gets lower than that of the other, respectively, thereby providing a smooth changeover of speed stages in the transmission, while when the hydraulically operated friction engaging means is hydraulically engaged, the two rotary components are connected with one another to transmit torque therebetween in both rotational directions thereby providing the availability of engine braking in the transmission when the inertia force of the vehicle would accelerate the engine.

Conventionally, automatic transmissions are generally designed to engage a certain friction engaging means which provides the availability of engine braking when the manual shift lever is shifted to an under-D range shift position such as the 2 range or L range shift position. Therefore, when such a certain friction engaging means is engaged by a shifting of the manual shift lever to the 2 range shift position at which at least two speed stages are available, the engine brake is available at all of those speed stages.

However, when the transmission is shifted up from the 1st speed stage to the 2nd speed stage, it is desirable from a view point of accomplishing smooth speed stage shifting in the vehicle, particularly in the low coasting condition with no or very light depression of the accelerator pedal in which condition the upshifting is more likely to occur, that even under the 2 range operation the friction engaging means provided in parallel with a one way clutch for the availability of engine braking is not engaged so as to avoid shift shocks.

Therefore, it is a first object of the present invention to provide a hydraulic control device of an automatic transmission in a vehicle which is adapted to disengage a certain friction engaging means for the availability of engine braking at a certain first speed stage under a certain under-D range shift condition and to engage said certain friction engaging means at a certain second speed stage higher than said certain first speed stage under the same under-D range shift condition.

The above-mentioned certain friction engaging means is engaged when said certain second speed stage is set up under said certain under-D range shift condition. Such a certain second speed stage under such a certain under-D range manual shift condition can be attained in various manners. Assuming, for example, that said certain second speed stage is the 2nd speed stage and said certain under-D range shift condition is the 2 range shift condition which allows the 1st speed stage and the 2nd speed stage to be set up, the 2nd speed stage under the 2 range shift condition can be attained from (i) the 2nd, 3rd or further higher speed stage under the D range shift condition with a shifting of the manual shift lever from the D range shift position to the 2 range shift position; (ii) the 1st speed stage under the D range shift condition with a shifting of the manual shift lever from the D range shift position to the 2 range shift position; and (iii) the 1st speed stage under the 2 range shift condition with holding of the manual shift lever at the 2 range shift position.

In the above case (i), it is generally desirable that said certain friction engaging means is engaged as soon as possible so that the engine braking should be available as soon as possible according to the driver's request. However, in the above cases (ii) and (iii), i.e. the upshifting from the 1st speed stage to the 2nd speed stage, at least one other friction engaging means is newly engaged or disengaged to change over the internal connections between the components of a gear assembly such as a planetary gear mechanism. The engagement or disengagement of such other friction engaging means generally requires a gradual supply or exhaust of a hydraulic fluid to or from said friction engaging means in order to obtain a smooth variation of torque in the output shaft of the transmission. Therefore, when said certain friction engaging means is engaged in the above cases (ii) and (iii), it is desirable that said certain friction engaging means is engaged gradually according to a certain delay schedule so as to match with the changing over engagement or disengagement of said friction engaging means for the shifting the transmission from the 1st speed stage to the 2nd speed stage.

Therefore, it is a second object of the present invention to provide a hydraulic control device according to said first object so that said certain friction engaging means is engaged at individually appropriately controlled speeds according to the kinds of speed stage shifting of the automatic transmission.

SUMMARY OF THE INVENTION

According to the present invention the above-mentioned first object is fundamentally accomplished by a hydraulic control device of an automatic transmission in a vehicle such as an automobile, said automatic transmission comprising a combination of a gear mechanism and friction engaging means adapted to provide a certain first speed stage and a certain second speed stage higher than said certain first speed stage according to selective engagement and disengagement of said friction engaging means under a certain under-D manual shift range, comprising a means for controlling engagement and disengagement of a certain one of said friction engaging means so as not to provide availability of engine braking at said certain first speed stage and to provide availability of engine braking at said certain second speed stage under said certain under-D manual shift range.

Further, according to the present invention the above-mentioned second object is fundamentally accomplished by a hydraulic control device such as described above, wherein said availability of engine braking at said certain second speed stage under said certain under-D manual shift range is obtained by engagement of said certain one friction engaging means, further comprising a means for controlling speed of engagement of said certain one friction engaging means so that said speed of engagement is substantially lower when said automatic transmission is shifted up from said certain first speed stage under any optional manual shift range to said certain second speed stage under said certain under-D manual shift range than when said automatic transmission is shifted to said certain second speed stage under said certain under-D manual shift range from any other speed stage and/or manual shift range.

In the above-mentioned hydraulic control device, when said automatic transmission is shifted up from said certain first speed stage under any optional manual shift range to said certain second speed stage under said certain under-D manual shift range, said means for controlling said speed of engagement of said certain one friction engaging means may control a flow resistance in a passage system conducting a hydraulic fluid to said certain one friction engaging means so that said flow resistance is once decreased to a minimum for a certain period to expedite readiness of said passage system for operation, then is increased to a maximum, and then is gradually decreased to the minimum according to progress of said upshifting.

The above-mentioned hydraulic control device may further comprise a manual shift valve adapted to deliver a hydraulic pressure at a certain port thereof when it is in a shift position to provide said certain under-D manual shift range, and a first shift valve adapted to be shifted between a first shift position to supply said hydraulic pressure delivered from said certain port of said manual shift valve to said certain one friction engaging means and a second shift position not to supply said hydraulic pressure delivered from said certain port of said manual shift valve to said certain one friction engaging means.

Further, in the above-mentioned hydraulic control device, said manual shift valve may also deliver said hydraulic pressure at said certain port thereof when it is in a shift position to provide a certain second under-D manual shift range on a further underside of said first-mentioned under-D manual shift range, further comprising a second shift valve adapted to be shifted between a first and a second shift position for selectively setting up a certain third speed stage, a solenoid valve adapted to be selectively energized or deenergized so as to control shifting of said second shift valve between said first and second shift positions, said second shift valve being adapted to be supplied with said hydraulic pressure from said certain port of said manual shift valve so as to be shifted to one of said first and second shift positions regardless of energization or deenergization of said solenoid valve when said hydraulic pressure from said certain port of said manual shift valve is supplied thereto, and a means for switching over the hydraulic pressure delivered from said certain port of said manual shift valve between a passage leading to said certain one friction engaging means through said first shift valve for operation under said first-mentioned certain under-D manual shift range and a passage leading to said certain one friction engaging means while bypassing said first shift valve for operation under said certain second under-D manual shift range according to energization or deenergization of said solenoid valve.

Further, in the above-mentioned hydraulic control device, said means for controlling speed of engagement of said certain one friction engaging means may comprise a modulator valve for controlling said flow resistance in said passage system conducting the hydraulic fluid to said certain one friction engaging means, said modulator valve having a first control port and being adapted to increase said flow resistance along with increase of a control pressure supplied to said first control port thereof.

Further, in the above-mentioned hydraulic control device, said means for controlling speed of engagement of said certain one friction engaging means may further comprise a linear solenoid valve for generating said control pressure supplied to said first control port of said modulator valve at a pressure level which changes in accordance with a duty ratio of an electric current supplied thereto.

Further, in the above-mentioned hydraulic control device, said modulator valve may further have a second control port adapted to generate a force from a hydraulic pressure supplied thereto to oppose a shifting thereof according to the control pressure supplied to said first control port thereof, said second port being supplied with an accumulator back pressure available in said hydraulic control device.

BRIEF DESCRIPTION OF THE DRAWINGS

In the accompanying drawings.

DESCRIPTION OF THE PREFERRED EMBODIMENTS

In the following the present invention will be described in more detail with respect to some preferred embodiments with reference to the accompanying drawings.

Figure 1:
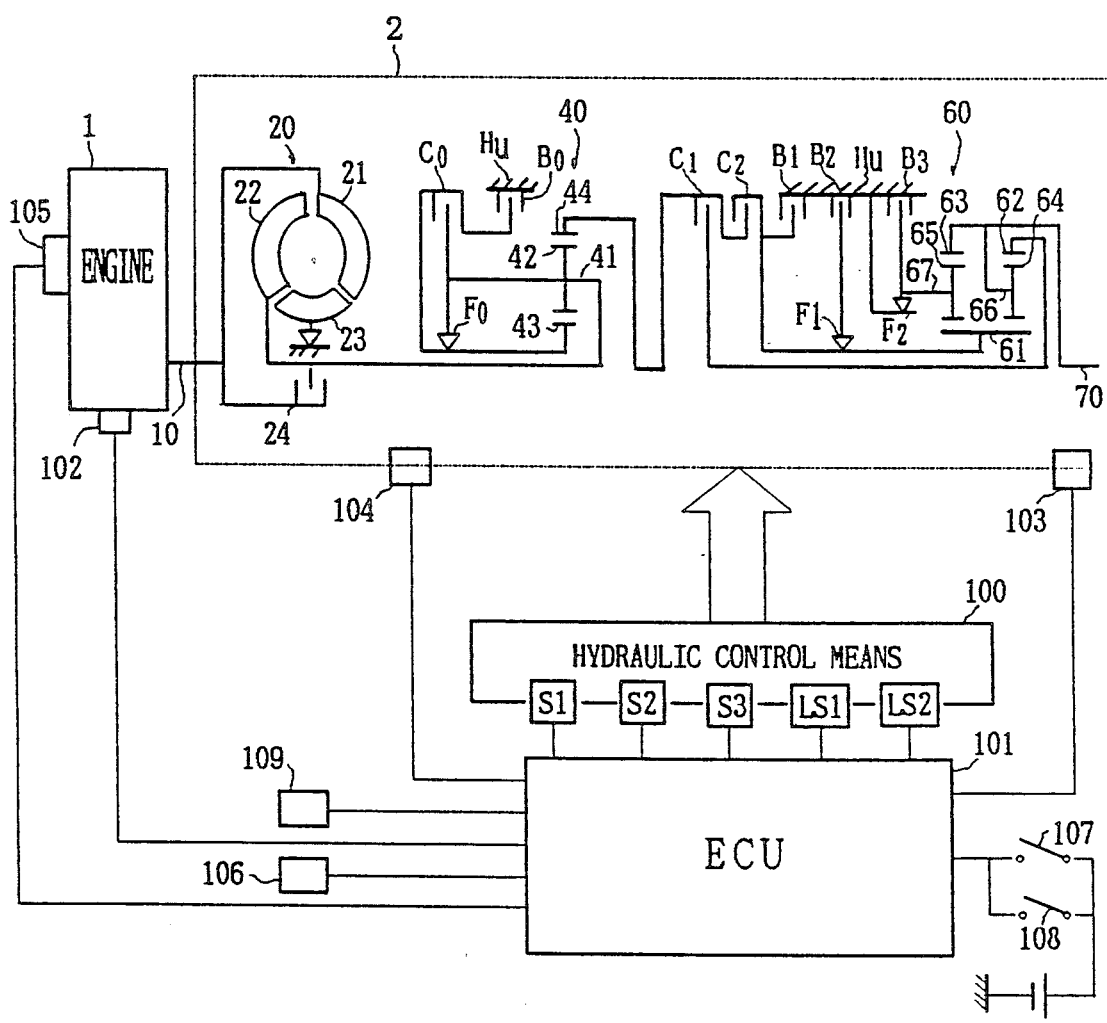
FIG. 1 is a diagrammatical illustration of an automatic transmission in a vehicle including mechanical components such as a torque converter, a planetary type speed change gear mechanism and a hydraulic control means, and an electronic control means.

Referring to FIG. 1 illustrating diagrammatically an automatic transmission in a vehicle in which the transmission control system according to the present invention may be incorporated, the transmission generally designated by reference numeral 2 comprises a torque converter 20 of a conventional type having a pump 21 connected with an engine 1 via a shaft 10, a turbine 22 and a stator 23, a lock-up clutch 24 for selectively directly connecting the pump 21 with the turbine 22, a first transmission unit 40 including a planetary gear mechanism having a sun gear 43, a ring gear 44, a planetary pinion 42 and a carrier 41 connected with the turbine 22 of the torque converter 20, a clutch $C_0$ for selectively connecting the sun gear 43 with the carrier 41, a brake $B_0$ for selectively braking the sun gear 43 relative to a housing $H_u$ and a one way clutch $F_0$ for torque transmittingly connecting the sun gear 43 with the carrier 41 only in one rotational direction, and a second transmission unit 60 including a first planetary gear mechanism having a sun gear 61, a ring 62, a planetary pinion 64 and a carrier 66, a second planetary gear mechanism having a sun gear 61 common with the sun gear 61 of the first planetary gear mechanism, a ring gear 63, a planetary pinion 65 an a carrier 67, a clutch $C_1$ for selectively connecting the ring gear 62 with the ring gear 44 of the first transmission unit 40, a clutch $C_2$ for selectively connecting the sun gears 61 with the ring gear 44 of the first transmission unit 40, a brake $B_1$ for selectively braking the sun gears 61 relative to the housing $H_u$, a series combination of a brake $B_2$ and a one way clutch $F_1$ for selectively braking the sun gears 61 only in one rotational direction when the brake $B_2$ is engaged, a brake $B_3$ for selectively braking the carrier 67 relative to the housing $H_u$, and a one way clutch $F_2$ for braking the carrier 67 relative to the housing $H_u$ only in one rotational direction, wherein the carrier 66 and the ring gear 63 are connected with one another to serve as an output shaft of the transmission.

The clutches $C_0$, $C_1$ and $C_2$ and the brakes $B_0$, $B_1$, $B_2$ and $B_3$ are hydraulically operated to be engaged or disengage by a hydraulic pressure control means 100 including solenoids $S_1$ and $S_2$ which control in combination supply and exhaust of a hydraulic pressure to and from the clutches $C_1$ and $C_2$ and the brakes $B_1$, $B_2$ and $B_3$ so as to change over the second transmission unit 60 in three different gear ratios, a solenoid $S_3$ which controls supply and exhaust of a hydraulic pressure to and from the Clutch $C_0$ and the brake $B_0$ so as to change over the first transmission unit 40 in two different gear ratios, and further linear solenoid valves $LS_1$ and $LS_2$ which will be described in more detail later.

These solenoid valves are electrically controlled by an electric control unit (ECU) 101 which receives various signals from various sensors or switches with regard to information for controlling the transmission, including throttle opening representing the load imposed on the engine from an engine throttle sensor 102, vehicle speed from a vehicle speed sensor 103, shift position of the manual shift valve from a shift position sensor 104, engine temperature from a engine temperature sensor 105, select of patterns such as power, normal and economy patterns with regard to the vehicle driving mode from a pattern select switch 106, applied condition of the foot brake from a foot brake switch 107, on or off of a side brake from a side brake sensor 108, and rotational speed of the outer race of the clutch $C_0$ which is selectively braked by the brake $B_0$ from a clutch speed sensor 109.

The serial combination of the first transmission unit 40 and the second transmission unit 60 may be controlled according to one of the conventional methods in this art to provide four forward speed stages by the second transmission unit 60 being changed over between three different gear ratios while the first transmission unit 40 is maintained in its lower gear stage so that the 1st, 2nd and 3rd speed stages are provided, and then by the first transmission unit 40 being changed over to its higher gear stage while the second transmission unit 60 is maintained at the 3rd speed stage so that the 4th speed stage is provided as an overdrive stage. (Of course a reverse stage is also provided, as well known in the art.) However, the serial connection of the first transmission unit 40 and the second transmission unit 60 shown in FIG. 1 is herein controlled by the electric control unit 101 and the hydraulic control means 100 to provide six forward speed stages by on and off combinations of the clutches $C_0$–$C_2$, the brakes $B_0$–$B_3$ and the one way clutches $F_1$–$F_2$ as shown in Table 1:

TABLE 1

| Range | Speed | C0 | B0 | C1 | C2 | B1 | B2 | B3 | F0 | F1 | F2 |
|---|---|---|---|---|---|---|---|---|---|---|---|
| R | — | ○ | | | ○ | | ○ | ○ | | | |
| D | 1st | ○ | | ○ | | | | | ○ | | ○ |
| D | 2nd | ○ | | ○ | | | ○ | | ○ | ○ | |
| D | 3rd | ○ | | ○ | | ○ | | | ○ | ○ | |
| D | 4th | ○ | | ○ | ○ | | | | ○ | | |
| D | 5th | ○ | | | ○ | ○ | | | | | |
| D | 6th | | ○ | | ○ | ○ | | | | | |
| 2 | 1st | ○ | | ○ | | | | | ○ | | ○ |
| 2 | 2nd | ○ | | ○ | | | ○ | ○ | ○ | ○ | |
| L | 1st | ○ | | ○ | | | | ○ | ○ | | ○ |

In the above table, "○" indicates that the clutch, brake or one way clutch is engaged at the corresponding speed stage under the corresponding shift range.

As will be noted in the above table, the brake $B_3$ is not engaged at the 1st speed stage and is engaged only at the 2nd speed stage under the 2 range shift condition. By this arrangement it is effectively avoided that, when the transmission is shifted up from the 1st speed stage to the 2nd speed stage, the direction of torque transmission between the engine and the vehicle wheels is reversed even at a moment.

Figure 2:
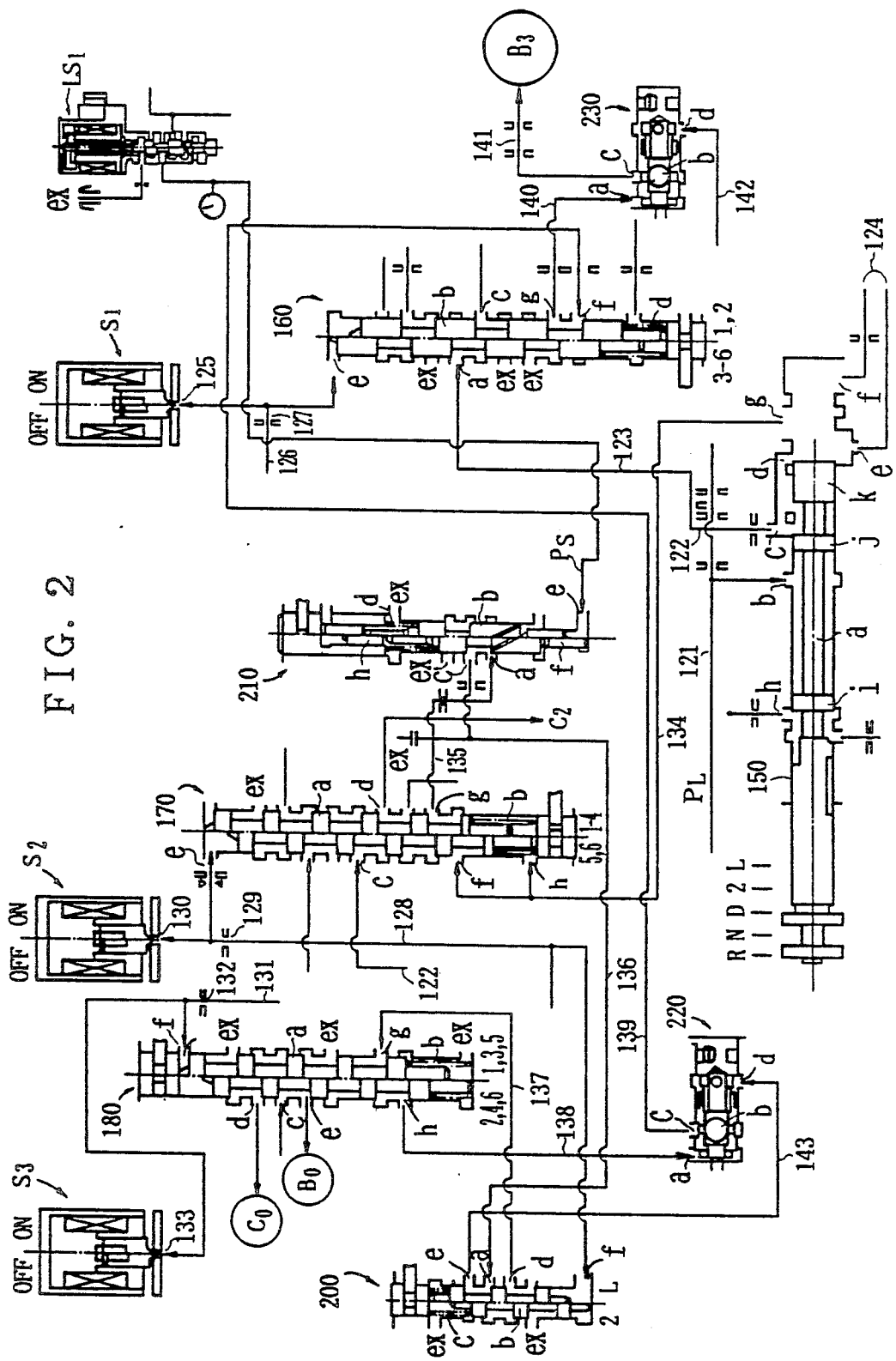
FIG. 2 is a diagrammatical illustration of an embodiment of the hydraulic control means.

FIG. 2 shows diagrammatically the essential portions of the hydraulic control means 100 which are concerned with the control operation according to the present invention.

In the figure, reference numeral 150 designates a manual shift valve adapted to be operated by the driver to select the shift ranges by being set to shift positions such as R, N, D, 2 and L. The manual shift valve 150 has a valve spool 150a (designated as merely "a" to spare a relatively small space available in the drawing, and this rule is applied to all similar designations) shown in its neutral position, and ports 150b, 150c, 150d, 150e, 150f, 150g and 150h adapted to be controlled by land portions 150i, 150j and 150k of the valve spool. When the valve spool 150a is shifted to a "D" position corresponding to the D range, the line pressure supplied to the port 150b through a source passage 121 is led to the port 150c and then to a passage 122 so as to be supplied to various principal working portions of the hydraulic control means including the clutch $C_1$ (not shown in FIG. 4) and a port 160a of a first shift valve 160 through a passage 123. When the valve spool 150a is shifted to a "2" position corresponding to the 2 range, the line pressure supplied to the port 150b is led to the port 150c as well as the port 150d, then to the port 150e, then through a passage 124 the detail of which is omitted since it is not directly concerned with the present invention to the port 150f, and then to the port 150g. When the valve spool 150a is shifted to an "L" position corresponding to the L range, the line pressure supplied to the port 150b is led the port 150c as well as the port 150d, and then directly to the port 150g. Therefore, the port 150g delivers the line pressure when the 2 range and the L range are selected. In addition, when the valve spool 150a is shifted to an "R" position corresponding to the R range, the line pressure supplied to the port 150b is led to the port 150b as well as to the port 150h.

The first shift valve 160 illustrated in the figure to an extent of detail necessary for describing the present invention has a valve spool 160b adapted to control communication of the above-mentioned port 160a with a port 160c which finally leads to the brake $B_2$ not shown in FIG. 2 so as to supply the line pressure to the brake $B_2$ when the valve spool is shifted upward in the figure by a biasing force of a spring 160d and not to supply the line pressure to the brake $B_2$ when the valve spool is shifted down in the figure by a control pressure being supplied to its control port 160e against the biasing force of the spring 160d. The valve spool 160b also controls communication between ports 160f and 160g so that a passage is established though these ports when and only when the valve spool is in the shifted down position, as referred to later.

The up and down shifting of the valve spool 160b of the first shift valve 160 is controlled by on and off of a solenoid valve $S_1$ referred to in FIG. 1. In the shown embodiment, the solenoid valve $S_1$ is a normally closed type valve adapted to hold a drain port 125 closed as long as it is not energized and to open the drain port 125 when it is energized. Therefore, the control port 160e of the first shift valve 160 is effectively supplied with the line pressure conducted through a source passage 126, whereas, when the solenoid valve $S_1$ is energized, the control port 160e is supplied with no effective pressure as the pressure supplied through the source passage 126 is drained at the downstream of an orifice 127. As will be understood in view of Table 1, the solenoid $S_1$ is energized when the transmission provides the 1st and the 2nd speed stage and is not energized when the transmission provides the 3rd through the 6th speed stage.

A spool type shift valve designated by reference numeral 170 is a second shift valve which is also illustrated to an extent of detail necessary for describing the present invention. This valve has a valve spool 170a adapted to be shifted up in the figure by a spring 170b thereby isolating a port 170c supplied with the hydraulic pressure from the port 150c of the manual shift valve 150 through the passage 122 from a port 170d which leads to the clutch $C_2$ not shown in this figure and to be shifted down in the figure when the line pressure conducted through a source passage 128 is effectively supplied to its control port 170e so as to communicate the port 170c with the port 170d. The valve spool 170a also controls communication of a port 170f with a port 170g so that they are in communication only when the valve spool is in the shifted up position. However, when the port 170f is supplied with the hydraulic pressure which is of the same level as the line pressure as described hereinunder, the same pressure is also supplied to a port 170h. Therefore, when the hydraulic pressure is supplied to the port 170f, the valve spool 170a is always shifted upward in the figure at least by the force of the spring regardless of supply or non supply of the control pressure to the control port 170e.

The supply of the control pressure to the control port 170e of the second shift valve 170 is controlled by the solenoid $S_2$ referred to in FIG. 1. In the shown embodiment, the solenoid valve $S_2$ is also a normally closed type valve similar to the solenoid valve $S_1$. Therefore, in cooperation with an orifice 129 provided in the source passage 128 conducting the line pressure supplied form the source passage 128 to the control port 170e the solenoid valve $S_2$ controls the up and down shifting of the valve spool 170a so as to shift it down in the figure when it is not energized so as to close its drain port 130 and to allow it to shift up in the figure when it is energized so as to open the drain port 130, thereby nullifying the pressure at the downstream of the orifice 129.

As will be understood in view of Table 1, the solenoid valve $S_2$ is energized when the transmission provides the 1st through the 4th speed stages and is not energized when the transmission provides the 5th and the 6th speed stages. However, as will be described hereinunder, the solenoid valve $S_2$ is also used for discriminating the 2 range from the L range with respect to the hydraulic pressure delivered to the port 150g of the manual shift valve 150 in both the 2 range and the L range.

A third shift valve 180 is provided for controlling the clutch C0 and the brake B0 of the first transmission unit 40, as illustrated to an extent of detail necessary for describing the present invention. This valve has a valve spool 180a adapted to be shifted up in the figure by a spring 180b so as to communicate a port 180c supplied with the hydraulic pressure from the port 150c of the manual shift valve 150 through the passage 122 with a port 180d which leads to the clutch $C_0$ not shown in this figure while isolating the port 180c from a port 180e which leads to the brake $B_0$ not shown in this figure and to be shifted down in the figure so as to communicate the port 180c with the port 180e while isolating the port 180c from the port 180d when the line pressure supplied through a source passage 131 is effectively supplied to its control port 180f. The selective supply of the control pressure to the control port 180f is controlled by the solenoid valve $S_3$ referred to in FIG. 1 in cooperation with an orifice 132 provided in the source passage 131 conducting the line pressure to the control port 180f. In this embodiment, the solenoid valve $S_3$ is also a normally closed type valve similar to the solenoid valves $S_1$ and $S_2$, having a drain port 133 adapted to be closed or opened corresponding to non energization or energization of the solenoid valve $S_3$. As will be understood in view of Table 1, the solenoid valve $S_3$ is energized so as substantially to exhaust the control port 180f when the transmission provides the 1st, the 3rd and the 5th speed, and is not energized so as effectively to supply the line pressure to the control port 180f when the transmission provides the 2nd, the 4th and the 6th speed stage.

The hydraulic pressure delivered to the port 150g of the manual shift valve 150 is conducted through a passage 134 to the ports 170f and 170h of the second shift valve 170. When this pressure is supplied, the valve spool 170a is shifted up in the figure regardless of whether the solenoid valve $S_2$ is energized or not energized as described above. Therefore, this pressure traverses the second shift valve 170 and is further conducted through a passage 135 to a port 210a of a low coast modulator valve 210.

The low coast modulator valve 210 is a valve which controls the valve of the hydraulic pressure supplied to the brake $B_3$, and has a valve spool 210b adapted to control communication of the port 210a with a port 210c in a continually variable manner according to a slight up and down movement of the valve spool 210b. The valve spool 210b is biased downward in the figure by the force of a spring 210d and upward in the figure by a force generated from a hydraulic pressure supplied to a port 210e via a plug 210f. The operation of the low coast modulator valve 210 will be described in more detail later.

The hydraulic pressure delivered to the port 210c of the low coast modulator valve 210 is conducted through a passage 136 to a port 200a of a relay valve 200 which discriminates the hydraulic pressure supplied from the port 150g between the pressure due to the 2 range and the pressure due to the L range under the control of the solenoid valve $S_2$. The relay valve 200 has a valve spool 200b adapted to be shifted down in the figure by a spring 200c so as to communicate the port 200a with a port 200d while isolating the port 200a from a port 200e and to be shifted up in the figure so as to communicate the port 200a with the port 200e while isolating the port 200a from the port 200d when a control pressure is supplied to a control port 200f.

The selective supply of the control pressure to the control port 200f is controlled by the solenoid valve $S_2$. As described above, the solenoid valve $S_2$ is primarily provided to change over the speed stages between a group of the 1st through the 4th speed stage and a group of the 5th and the 6th speed stage. However, according to the present invention, this solenoid valve is used for duplicate purposes in order to save the costs of the transmission. When the hydraulic pressure delivered to the port 150g of the manual shift valve 150 is supplied to the ports 170f and 170h of the second shift valve 170, the valve spool 170a is held at its shifted up position regardless of the on or off of the solenoid valve $S_2$, as already described. Therefore, when the manual shift valve 150 is shifted to the "2" position or the "L" position, the solenoid valve $S_2$ may be switched over for the second use of discriminating the pressure supplied from the port 150g of the manual shift valve 150 between the pressure due to the setting up of the 2 range and that due to the setting up of the L range. In the shown embodiment, the solenoid valve $S_2$ is, under the 2 and the L range, so controlled to be energized when the shift range is the 2 range and not to be energized when the shift range is the L range. In fact, however, since the solenoid valve $S_2$ is energized when the transmission provides the 1st through the 4th speed stage, the exception with regard to the control of the solenoid valve $S_2$ is only that it is deenergized when the manual shift valve 150 is shift to the L range shift position.

Thus, when the manual shift valve 150 is shifted to the 2 range shift position, the hydraulic pressure delivered to the port 150g thereof and supplied to the port 200a of the relay valve 200 is delivered to the port 200d, and then the pressure is supplied through a passage 137 to a port 180g of the third shift valve 180. The valve spool 180a of the third shift valve 180 is shifted up in the figure when the transmission provides the 1st speed stage and is shifted down in the figure when the transmission provides the 2nd speed stage. Therefore, the hydraulic pressure supplied to the port 180g is not transmitted to a port 180h at the 1st speed stage and is transmitted to the port 180h at the 2nd speed stage.

The hydraulic pressure delivered to the port 180h only at the 2nd speed stage when the manual shift valve 150 is shifted to the 2 range shift position is conducted through a passage 138 to a port 220a of a switch valve 220 having a valve ball 220b, and then the pressure is delivered to a port 220c while shifting the valve ball 220b rightward in the figure. This pressure is then conducted through a passage 139 and the ports 160f and 160g of the first shift valve 160 so that the pressure is passed therethrough only when the valve spool 160b is shifted down in the figure so as to provide the 1st and the 2nd speed stage. The pressure is conducted through the first shift valve 160 for the purpose of avoiding overrunning of the engine which would happen if the brake $B_3$ is engaged at high speed stages such as the 3rd through the 6th speed stage.

The pressure delivered to the port 160g is conducted through a passage 140 to a port 230a of a switch valve 230 having a valve ball 230b, and then the pressure is delivered to a port 230c while shifting the valve ball 230b rightward in the figure. The pressure delivered to the port 230c is then supplied through a passage 141 to the brake $B_3$. The switch valve 230 is provided to discriminate the pressure supplied through the above-mentioned passage system for engaging the brake B3 for the availability of engine braking from a similar hydraulic pressure supplied to its port 230d through a reverse stage setting up system including a passage 142 which is connected to the port 150h of the manual shift valve 150.

When the manual shift valve 150 is shifted to the L range shift position, the solenoid valve $S_2$ is deenergized, so that the pressure rises in the passage 128 and the control port 200f of the relay valve 200. Then the valve spool 200b is shifted up, so that the pressure supplied to the port 200a is now delivered to the port 200e. This pressure is conducted through a passage 143 to a port 220d of the switch valve 220, and then, by shifting the ball 220b leftward in the figure, is conducted through the passage 139 toward the brake $B_3$.

Thus, according to the above-mentioned arrangements of the electric control means and the hydraulic control means the brake $B_3$ is controlled so as not to be engaged at the 1st speed stage and is engaged at the 2nd speed stage under the 2 range shift condition, and is engaged at the 1st speed stage under the L range shift condition.

The speed for the brake $B_3$ being put into engagement from its disengaged condition is controlled by the low coast modulator valve 210. As already described, the degree of communication between the ports 210a and 210c forming a part of the passage for conducting the hydraulic pressure delivered to the port 150g of the manual shift valve 150 to the brake $B_3$ is controlled by the valve spool 210b of the low coast modulator valve 210 so as to be decreased along with the upward shifting of the valve spool 210b in the figure until it can be decreased to zero, i.e. interruption of the communication between the ports 210a and 210c, thereby cutting the supply of hydraulic pressure to the brake $B_3$. Therefore, the speed of putting the brake $B_3$ into engagement is controlled by controlling the pressure $P_s$ supplied to a control port 210e of the low coast modulator valve 210.

The pressure $P_s$ supplied to the port 210e is controlled by a linear solenoid valve $LS_1$ which can generate a gradually variable hydraulic pressure from a source hydraulic pressure, conveniently the line pressure, supplied thereto according to changes of the duty ratio of the electric current supplied to its solenoid. In the shown embodiment, the linear solenoid valve $LS_1$ provides the pressure $P_s$ to be supplied to the control port 210d at the lowest pressure level, conveniently atmospheric pressure, when the duty ratio of the electric current supplied to its solenoid is the lowest, conveniently zero, and the highest pressure level available from the source hydraulic pressure supplied thereto when the duty ratio of the electric current supplied to its solenoid is the highest, conveniently 100%, gradually changing the pressure $P_s$ corresponding to a medium duty ratio of the electric current supplied thereto.

In this case, when the $P_s$ is increased toward 100%, the port 210c is isolated from the port 210a before the duty ratio gets to 100%.

Figure 3:
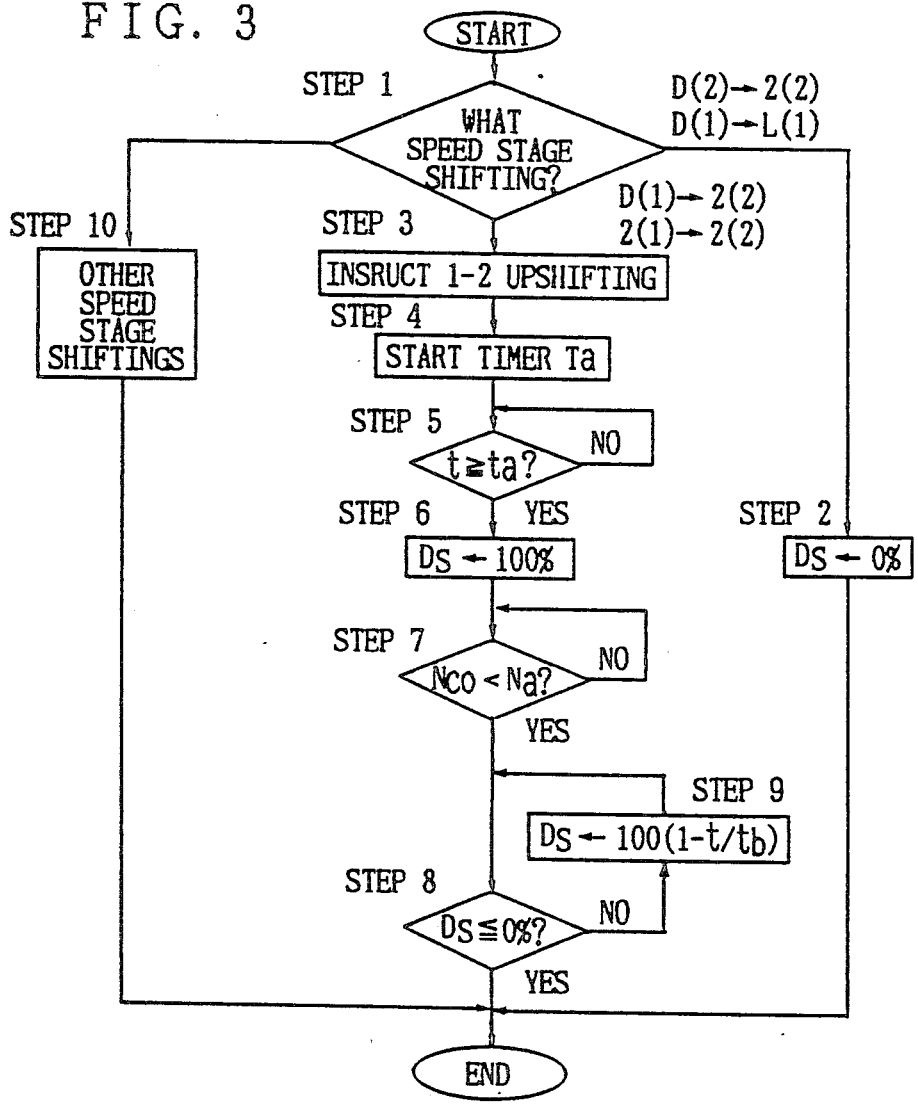
FIG. 3 is a flowchart illustrating a control process carried out by the electronic control means.

The linear solenoid valve LS1 may be controlled as shown by a flowchart in FIG. 3. According to this control, after the start of control, in step 1 it is judged whether the speed stage shifting is (i) from the 2nd speed stage under the D range to the 2nd speed stage under the 2 range or from the 1st speed stage under the D range to the 1st speed stage under the L range, (ii) from the 1st speed stage under the D range to the 2nd speed stage under the 2 range, or from the 1st speed stage to the 2nd speed stage under the 2 range, or (iii) other speed stage shifting.

When it is judged that the answer is (i), the flow of control proceeds to step 2 and the duty ratio $D_s$ of the electric current supplied to the linear solenoid $LS_1$ is made 0%.

When it is judged that the answer is (ii), the flow of control proceeds to step 3 and an instruction signal for a 1st to 2nd shift up is despatched, and then the flow of control proceeds to step 4. In step 4, a timer Ta is started, and then the flow of control proceeds to step 5. In step 5, it is judged if a period ta has lapsed. Until the answer turns from "no" to "yes" the flow of control returns to before the step 5, and when the period ta has lapsed, the flow of control proceeds to step 6, and the duty ratio $D_s$ of the electric current supplied to the linear solenoid $LS_1$ is increased to 100%. Then the flow of control proceeds to step 7.

In step 7, it is judged if the rotational speed $N_{co}$ of the outer race of the clutch $C_0$ detected by the clutch rotational speed sensor 109 has decreased to be less than a certain predetermined value Na which indicates a half engagement of the brake $B_0$. Until the answer turns from "no" to "yes" in the step 7, the flow of control returns to before the step 7, and when the rotational speed $N_{co}$ has lowered below Na, then the flow of control proceeds to step 8.

In step 8, it is judged if the duty ratio $D_s$ has decreased to 0%. In the first pass, the answer is of course "no", and then the flow of control proceeds to step 9, and the duty ratio $D_s$ is decreased as much as 100(t/tb), and then the flow of control is returned before the step 8. After a substantial repeat of the steps 8 and 9, the answer in step 8 will turn to "yes", and the process of control is finished.

When it is judged that the answer is (iii), the flow of control proceeds to step 10 and a certain speed shift control not concerned with the present invention is carried out.

Figure 4:
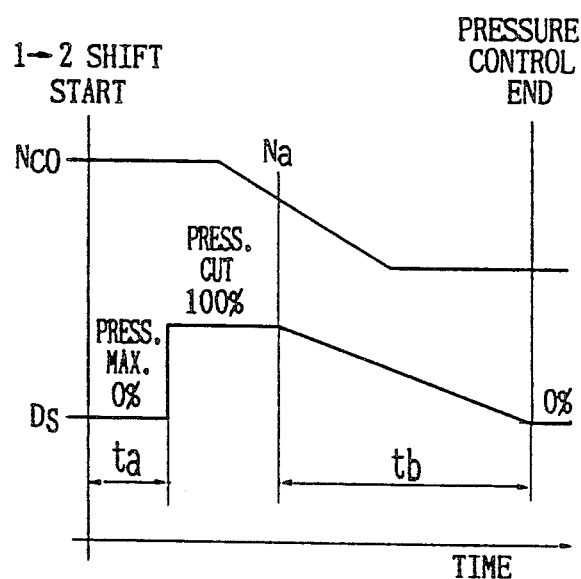
FIG. 4 is a graph showing the performance of the control available by the control process shown in FIG. 3.

FIG. 4 shows how the duty ratio $D_s$ and the rotational speed $N_{co}$ of the outer race of the clutch C0 change with the lapse of time in accordance with the control by the flowchart of FIG. 3. A delay of the period ta is provided to make the hydraulic system ready to operate at highly stability with full charge of a hydraulic liquid in the hydraulic system, and period tb is the period during which the duty ratio $D_s$ returns from 100% to 0% by the gradual reduction carried out in the step 9 in FIG. 3 so as to provide a smooth speed stage shifting.

Figure 5:
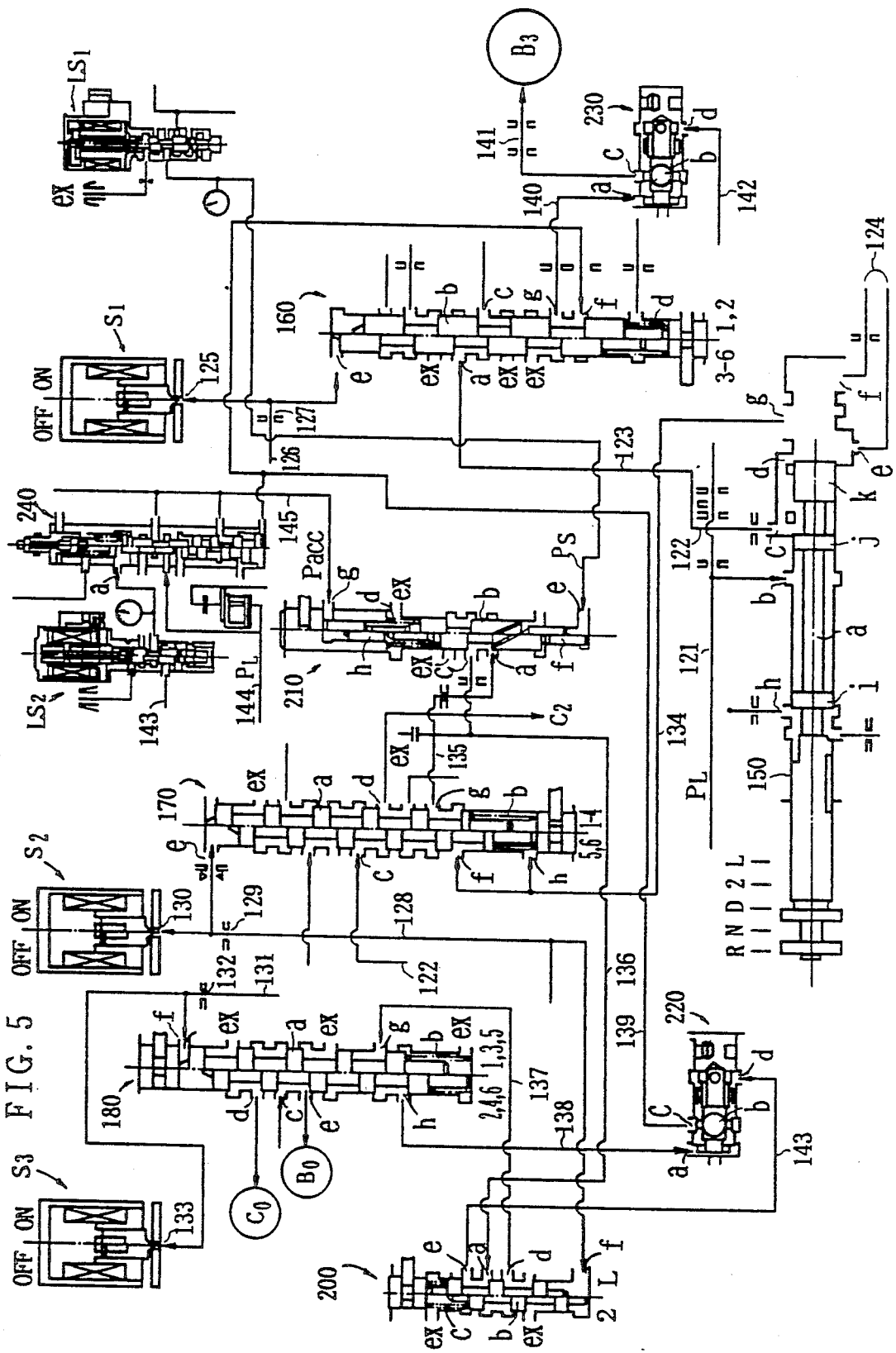
FIG. 5 is a view similar to FIG. 2, illustrating a modification applied to the hydraulic control means shown in FIG. 2.

FIG. 5 is a diagrammatical view similar to FIG. 2 with an additional control means for the low coast modulator valve 210. Therefore, the portions corresponding to those shown in FIG. 2 are designated by the same reference numerals in FIG. 2. According to this modification, a further control hydraulic pressure Pacc is supplied to a port 210g of the low coast modulator valve 210 so as to act on the valve spool 210b via a plug 210h. The pressure Pacc is not a hydraulic pressure particularly generated for the control of the low coast modulator valve 210 but is a pressure generally available in the hydraulic control means of an automatic transmission in a vehicle as an accumulator back pressure for supporting a piston in a piston type accumulator against a pressure to be accumulated. Such an accumulator back pressure is generated by an accumulator back pressure control means which, in the embodiment of FIG. 5, is shown as a combination of the linear solenoid valve $LS_2$ referred to in FIG. 1 and an accumulator control valve 240.

In the accumulator back pressure control means, the linear solenoid valve $LS_2$ is supplied with a source hydraulic pressure, conveniently the line pressure, through a source passage 143 and generates therefrom a pressure for controlling the accumulator control valve 240 as supplied to a port 240a thereof. The accumulator control valve 240 is also supplied with a source hydraulic pressure, conveniently the line pressure, through a source passage 144, and generates the accumulator back pressure Pacc in a passage 145 under the control of the linear solenoid $LS_2$. The accumulator back pressure Pacc generally has a pressure level of about 60% of the source pressure, i.e. the line pressure.

In the modification shown in FIG. 5, in the low coast modulator valve 210 the spring constant of the spring 210d, the pressure receiving end area of the plug 210f, and the pressure receiving end area of the plug 210h which is larger than that of the plug 210f are so designed based upon the normal pressure level of the control pressure $P_s$ and the accumulator back pressure Pacc that when the linear solenoid $LS_1$ operates normally, the downward force generated from the accumulator back pressure supplied to the port 210g is overcome by the upward force generated from the control pressure $P_s$ supplied to the port 210e varied within the variable range of the duty ratio $D_s$ applied to the linear solenoid valve $LS_1$.

However, when a failure has occurred in the linear solenoid $LS_1$ so that the control pressure $P_s$ supplied to the port 210e increases so much that the valve spool 210b is shifted up uncontrollably to interrupt the communication between the port 210a with the port 210c (This condition may be detected by any conventional means such as a pressure sensor.), then as a temporary countermeasure against the failure the accumulator back pressure Pacc is increased so that the downward force generated in the plug 210g from the accumulator back pressure is increased to shift the valve spool 210b downward in the figure, so as thereby to ensure the connection between the ports 210a and 210c, and to guarantee the engagement of the brake $B_3$. When the accumulator back pressure is increased to its maximum pressure level, i.e. the line pressure, the difference between the pressure receiving end areas of the plugs 210h and 210f can generates a downward force to shift the valve spool 210b under the same supply of the full line pressure at the ports 210e and 210g. In this connection, even when the valve spool 210b would stick at its shifted up position not to be shifted down by a small difference between the end areas of the plugs 210h and 210f times a relatively low level of the line pressure in the 1-2 upshifting under coasting, when once the line pressure is increased in power driving, the shifting of the valve spool 210b to the lower shift position based upon the difference between the end areas of the plugs 210*h* and 210*f* will be ensured.

Thus, according to the modification shown in FIG. 5, the basic control system shown in FIG. 2 is more improved to be less affected by a failure which could occur in the linear solenoid valve $LS_1$.

Although the invention has been described in detail with respect to some preferred embodiments thereof, it will be apparent to those skilled in the art that various modifications are possible without departing from the scope of the present invention.

We claim:

1. A hydraulic control device of an automatic transmission in a vehicle such as an automobile, said automatic transmission comprising a combination of a gear mechanism and friction engaging means adapted to provide a certain first speed stage and a certain second speed stage higher than said certain first speed stage according to selective engagement and disengagement of said friction engaging means when said transmission is in a certain under-D manual shift range, comprising a means for controlling engagement and disengagement of a certain one of said friction engaging means so as not to provide availability of engine braking at said certain first speed stage and to provide availability of engine braking at said certain second speed stage when said transmission is in said certain under-D manual shift range, wherein said availability of engine braking at said certain second speed stage in said certain under-D manual shift range is obtained by engagement of said certain one friction engaging means, further comprising a means for controlling a speed of engagement of said certain one friction engaging means so that said speed of engagement is substantially lower when said automatic transmission is shifted up from said certain first speed stage under any optional manual shift range to said certain second speed stage when in said certain under-D manual shift range than when said automatic transmission is shifted to said certain second speed stage in said certain under-D manual shift range from any other speed stage and/or manual shift range.

2. A hydraulic control device according to claim 1, wherein, when said automatic transmission is shifted up from said certain first speed stage under any optional manual shift range to said certain second speed stage under said certain under-D manual shift range, said means for controlling said speed of engagement of said certain one friction engaging means controls a flow resistance in a passage system conducting a hydraulic fluid to said certain one friction engaging means so that said flow resistance is initially increased to a maximum for a certain period to expedite readiness of said passage system for operation, then is decreased to a minimum, and then is gradually increased to the maximum according to progress of said upshifting.

3. A hydraulic control device according to claim 1, wherein said means for controlling speed of engagement of said certain one friction engaging means comprises a modulator valve for controlling the flow resistance in said passage system conducting the hydraulic fluid to said certain one friction engaging means, said modulator valve having a first control port and being adapted to increase said flow resistance along with increase of a control pressure supplied to said first control port thereof.

4. A hydraulic control device according to claim 3, wherein said means for controlling speed of engagement of said certain one friction engaging means further comprises a linear solenoid valve for generating said control pressure supplied to said first control port of said modulator valve at a pressure level which changes in accordance with a duty ratio of an electric current supplied to said linear solenoid value.

5. A hydraulic control device according to claim 4, wherein said means for controlling speed of engagement of said certain one friction engaging means further comprises a means for detecting rotational speed of a rotary member in said automatic transmission which substantially changes rotational speed thereof in accordance with a changeover of speed stages, and controls said linear solenoid based upon the rotational speed of said rotary member.

6. A hydraulic control valve according to claim 4, wherein said means for controlling speed of engagement of said certain one friction engaging means further comprises a means for supplying a hydraulic pressure to work in opposition to a hydraulic pressure controlled by said linear solenoid valve in said modulator valve.

7. A hydraulic control device according to claim 3, wherein said modulator valve furthwe has a second control port adapted to generate a force from a hydraulic pressure supplied to said modulator valve to oppose a shifting of said modulator valve according to the control pressure supplied to said first control port thereof, said second port being supplied with an accumulator back pressure available in said hydraulic control device.

8. A hydraulic control device according to claim 3, wherein said means for controlling speed of engagement of said certain one friction engaging means further comprises an electromagnetic valve, and said modulator valve is controlled by said electromagnetic valve.

9. A hydraulic control device according to claim 8, wherein said means for controlling speed of engagement of said certain one friction engaging means further comprises a means for supplying a hydraulic pressure to work in opposition to a hydraulic pressure controlled by said solenoid valve in said modulator valve.

10. A hydraulic control device according to claim 3, wherein said means for controlling speed of engagement of said certain one friction engaging means further comprises a means for detecting rotational speed of a rotary member in said automatic transmission which substantially changes rotational speed thereof in accordance with a changeover of speed stages, and controls the speed of engagement of said certain one friction engaging means based upon the rotational speed of said rotary member.

11. A hydraulic control device according to claim 1, wherein said gear mechanism comprises a first speed change gear mechanism and a second speed change gear mechanism, and said certain first and second speed stages are changed over by switching over of said second speed change gear mechanism.

12. A hydraulic control device according to claim 1, wherein said certain first speed stage is a lowest speed stage.

13. A hydraulic control device of an automatic transmission in a vehicle such as an automobile, said automatic transmission comprising a combination of a gear mechanism and friction engaging means adapted to provide a certain first speed stage and a certain second speed stage higher than said certain first speed stage according to selective engagement and disengagement of said friction engaging means when said transmission is in a certain under-D manual shift range, comprising a means for controlling engagement and disengagement of a certain one of said friction engaging means so as not to provide availability of engine braking at said certain first speed stage and to provide availability of engine braking at said certain second speed stage when said transmission is in said certain under-D manual shift range, further comprising a manual shift valve adapted to deliver a hydraulic pressure at a certain port thereof when it is in a shift position to provide said certain under-D manual shift range, and a first shift valve adapted to be shifted between a first shift position to supply said hydraulic pressure delivered from said certain port of said manual shift valve to said certain one friction engaging means and a second shift position not to supply said hydraulic pressure delivered from said certain port of said manual shift valve to said certain one friction engaging means, wherein said manual shift valve also delivers said hydraulic pressure at said certain port thereof when it is in a shift position to provide a certain second under-D manual shift range below said first-mentioned under-D manual shift range, further comprising a second shift valve adapted to be shifted between a first and a second shift position for selectively setting up a certain third speed stage in the D manual shift range, a solenoid valve adapted to be selectively energized or deenergized so as to control shifting of said second shift valve between said first and second shift positions, said second shift valve being adapted to be supplied with said hydraulic pressure from said certain port of said manual shift valve so as to be shifted to one of said first and second shift positions regardless of energization or deenergization of said solenoid valve when said hydraulic pressure from said certain port of said manual shift valve is supplied thereto, and a means for switching over the hydraulic pressure delivered from said certain port of said manual shift valve between a passage leading to said certain one friction engaging means through said first shift valve for operation under said first-mentioned certain under-D manual shift range and a passage leading to said certain one friction engaging means while bypassing said first shift valve for operation under asid certain second under-D manual shift range according to energization or deenergization of said solenoid valve.

* * * * *